US010851818B2

(12) United States Patent
Chi Man

(10) Patent No.: US 10,851,818 B2
(45) Date of Patent: Dec. 1, 2020

(54) DEVICES, KITS, AND METHODS FOR MOUNTING A MULTIFUNCTIONAL CLIP

(71) Applicant: Dyno Seasonal Solutions LLC, Pompano Beach, FL (US)

(72) Inventor: Tsui Chi Man, Siu Sai Wan (HK)

(73) Assignee: Dyno Seasonal Solutions LLC, Pompano Beach, FL (US)

( * ) Notice: Subject to any disclaimer, the term of this patent is extended or adjusted under 35 U.S.C. 154(b) by 0 days.

(21) Appl. No.: 16/720,306

(22) Filed: Dec. 19, 2019

(65) Prior Publication Data

US 2020/0124067 A1 Apr. 23, 2020

Related U.S. Application Data

(60) Division of application No. 15/635,338, filed on Jun. 28, 2017, now Pat. No. 10,544,814, which is a continuation of application No. 14/693,324, filed on Apr. 22, 2015, now Pat. No. 9,702,503.

(51) Int. Cl.

| | |
|---|---|
| ***F16B 2/22*** | (2006.01) |
| ***G09F 7/18*** | (2006.01) |
| ***B05B 15/62*** | (2018.01) |
| ***F16M 13/02*** | (2006.01) |
| ***F21V 21/088*** | (2006.01) |
| ***B25J 1/04*** | (2006.01) |

(Continued)

(52) U.S. Cl.

CPC ................ *F16B 2/22* (2013.01); *B05B 15/62* (2018.02); *B25J 1/04* (2013.01); *F16M 13/022* (2013.01); *F21V 21/088* (2013.01); *G09F 7/18* (2013.01); *F21W 2121/004* (2013.01); *G09F 1/103* (2013.01); *G09F 2007/186* (2013.01); *G09F 2007/1847* (2013.01)

(58) Field of Classification Search

CPC ... F16B 2/22; B05B 15/62; B25J 1/04; F16M 13/022; F21V 21/088; G09F 7/18; G09F 1/103; G09F 2007/1847; G09F 2007/186; F21W 2121/004

See application file for complete search history.

(56) References Cited

U.S. PATENT DOCUMENTS

| | | | |
|---|---|---|---|
| 2,634,999 | A | 4/1953 | Fjeld |
| 3,181,827 | A | 5/1965 | Sassin |
| 3,599,916 | A | 8/1971 | Szabo |

(Continued)

OTHER PUBLICATIONS

U.S. Appl. No. 15/635,338, filed Jun. 28, 2017, Multifunctional Clip.

(Continued)

*Primary Examiner* — Anita M King

(74) *Attorney, Agent, or Firm* — Greenberg Traurig, LLP; David J. Dykeman; Joshua M. Herman

(57) ABSTRACT

A device including a first clip portion including a bottom section having a first end and a second end opposite the first end, a first leg section extending from the first end of the bottom section, a second leg section extending from the second end of the bottom section, and a pole adaptor attachment portion; an arm projecting away from the first leg section; and a light string attachment portion located on the first leg section, the light string attachment portion including a substantially C-shaped clip defined by the arm, the first leg section, and the pole adaptor attachment portion.

17 Claims, 15 Drawing Sheets

610

600

630

604

(51) Int. Cl.
*G09F 1/10* (2006.01)
*F21W 121/00* (2006.01)

(56) References Cited

U.S. PATENT DOCUMENTS 5,267,764 A * 12/1993 Hoffman .................. E04B 9/18 248/340
5,388,802 A 2/1995 Dougan
6,048,010 A * 4/2000 Stocker .................. A47F 13/06 248/343
6,223,628 B1 * 5/2001 Barron .................... H01K 3/32 294/106
6,227,584 B1 * 5/2001 Reuther .................... B25J 1/04 294/104
6,338,460 B1 1/2002 Rumpel
6,425,614 B1 7/2002 Limber et al.
6,473,953 B1 * 11/2002 Portnoff ................... B25B 5/06 269/3
6,536,727 B1 3/2003 Limber et al.
6,572,062 B1 6/2003 Limber et al.
6,685,151 B2 2/2004 Vasquez et al.
6,827,379 B2 12/2004 Hill et al.
D537,330 S 2/2007 Cox et al.
7,252,210 B1 * 8/2007 Schultz ............... B65D 83/203 222/174
D564,347 S 3/2008 Limber
7,669,827 B2 3/2010 Urrutia
8,015,755 B2 9/2011 Miller
8,459,712 B2 6/2013 Thrasher et al.
8,888,337 B2 11/2014 Adams
9,056,393 B1 * 6/2015 Gary ......................... B25J 1/02
D756,764 S 5/2016 Limber
D772,027 S 11/2016 Chi Man
9,702,503 B2 7/2017 Chi Man
9,853,426 B2 * 12/2017 Hendricks ............... B25G 1/04
2009/0095848 A1 * 4/2009 Holbrook ................. F21S 4/10 248/74.2
2012/0284997 A1 * 11/2012 Morin ..................... G01R 1/22 29/525.01
2013/0333197 A1 * 12/2013 Schulte ................ F21V 21/088 29/525.08
2016/0312949 A1 10/2016 Chi Man
2017/0298969 A1 10/2017 Chi Man

OTHER PUBLICATIONS

U.S. Appl. No. 14/693,324, filed Apr. 22, 2015, Multifunctional Clip.

* cited by examiner

DEVICES, KITS, AND METHODS FOR MOUNTING A MULTIFUNCTIONAL CLIP

CROSS REFERENCE TO RELATED APPLICATIONS

This application is a divisional patent application of U.S. patent application Ser. No. 15/635,338, filed Jun. 28, 2017, which is a continuation application of U.S. patent application Ser. No. 14/693,324 filed on Apr. 22, 2015, now U.S. Pat. No. 9,702,503, the entirety of each of which is incorporated herein by reference.

FIELD

The disclosure relates generally to devices for attachment of objects to surfaces. More particularly, this disclosure relates to devices for attachment of objects, such as ornamental light strings, misting systems, signs, banners and similar objects to surfaces, such as gutters, shingles, walls and eaves attached to buildings.

BACKGROUND

Ornamental decorations are commonly hung from buildings, dwellings, and other architectural structures during annual holidays which are a popular pastime for people. The decorative lights are typically hung temporarily to a surface of a building. A ladder is often used to temporarily hang the decorative lights to a hanging position that is typically a substantial distance from ground level.

Therefore, there is a need for devices that allow for easy and convenient mounting of objects, such as ornamental light strings onto buildings and the like, without the need of the use of a ladder.

SUMMARY

According to the embodiments of the present disclosure, a device for securing objects such as ornamental light strings or misting systems, signs, banners and similar objects to surfaces, the device including a first clip portion including a bottom section having a first end and a second end opposite the first end, a first leg section extending from the first end of the bottom section, a second leg section extending from the second end of the bottom section, and a pole adaptor attachment portion; an arm projecting away from the first leg section; and a light string attachment portion located on the first leg section, the light string attachment portion including a substantially C-shaped clip defined by the arm, the first leg section, and the pole adaptor attachment portion.

According to embodiments of the present disclosure, a device also includes a second clip portion including an arm portion having a proximal end at the pole adaptor attachment portion and a distal end opposite the proximal end and a leg portion projecting from the distal end of the arm portion, the leg portion projecting at an acute angle to an approximate direction of the arm portion and in a same direction as a distal end of the second leg section of the first clip portion, wherein the leg portion is displaced in a space by a length of the arm such that the leg portion projects at an acute angle to the pole adaptor attachment portion. According to embodiments of the present disclosure, a device also includes a ridge extending from an inside surface of the leg portion of the second clip portion toward the pole adaptor attachment portion, wherein an inside surface of the distal end of the arm portion of the second clip portion and the ridge cooperate to form a second light string attachment portion. According to embodiments of the present disclosure, the second leg section of the clip portion includes a hook-shaped retention tab that is attached to the second leg section, such that the retention tab extends toward the leg portion of the second clip portion. According to embodiments of the present disclosure, the second leg section of the clip portion and the hook-shaped retention tab cooperate to form a third light string attachment portion.

According to embodiments of the present disclosure, the pole adaptor attachment portion is rectangular. According to embodiments of the present disclosure, the arm is arcuately shaped. According to embodiments of the present disclosure, the device also includes at least one of a light string, a misting system, a sign, or a banner.

According to embodiments, of the present disclosure, a device includes a telescoping pole having a first end and a second end opposite the first end; and an adaptor engaging the first end of the telescoping pole, the adaptor including a channel configured to be releasably coupled to a clip in at least a first position and a second position, the first position being configured to couple a clip to a first building structure, the second position being configured to couple a clip to a second building structure, wherein the second end of the telescoping pole is configured to be manipulated by a user so as to release a clip from the channel of the adaptor.

According to embodiments of the present disclosure, the channel is configured to be releasably coupled to a pole adaptor attachment portion of the clip. According to embodiments of the present disclosure, the telescoping pole includes a handle at the second end of the telescoping pole.

According to embodiments of the present disclosure, the telescoping pole includes a trigger that is operable by a user so as to release the clip from the channel of the adaptor. According to embodiments of the present disclosures, the adaptor further includes at least two spring-loaded devices, a portion of each of the at least two spring-loaded devices being biased to extend into the channel so as to retain the clip within the channel. According to embodiments of the present disclosures, the at least two spring-loaded devices are configured to retract from within the channel so as to release the clip from within the channel when the trigger of the telescoping pole is operated.

According to embodiments of the present disclosure, the clip includes a first clip portion including a bottom section having a first end and a second end opposite the first end, a first leg section extending from the first end of the bottom section, a second leg section extending from the second end of the bottom section, and a pole adaptor attachment portion; an arm projecting away from the first leg section; and a light string attachment portion located on the first leg section, the light string attachment portion including a substantially C-shaped clip defined by the arm, the first leg section, and the pole adaptor attachment portion. According to embodiments of the present disclosure, the clip further includes a further light string attachment portion.

According to embodiments of the present disclosure, a kit includes a pole mounting assembly including a telescoping pole having a proximal end and a distal end opposite the proximal end; an adaptor engaging the distal end of the telescoping pole, the adaptor including a channel, the channel being configured to be releasably couplable to a clip in at least a first position and a second position; and a handle fixed to the proximal end of the telescoping pole, the handle being configured to be manipulated by a user so as to release a clip from the channel of the adaptor; the kit also including at least one clip configured to be removably coupled to a first building structure when releasably coupled to the channel in the first position and configured to be removably coupled to a second building structure when releasably coupled to the channel in the second position.

According to embodiments of the present disclosure, the adaptor further includes at least two spring-loaded devices, a portion of each of the at least two spring-loaded devices being biased to extend into the channel so as to retain the clip within the channel. According to embodiments of the present disclosure, the telescoping pole includes a trigger proximate the proximal end, the trigger being operable to retract the at least two spring-loaded devices from the channel, thereby releasing the clip from within the channel.

According to embodiments of the present disclosure, the clip includes a first clip portion including a bottom section having a first end and a second end opposite the first end, a first leg section extending from the first end of the bottom section, a second leg section extending from the second end of the bottom section, and a pole adaptor attachment portion; an arm projecting away from the first leg section; and a light string attachment portion located on the first leg section, the light string attachment portion including a substantially C-shaped clip defined by the arm, the first leg section, and the pole adaptor attachment portion.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 10A is a perspective view of the two spring-loaded angled fingers extending partially into the channel of the adaptor. FIG. 10B is a perspective view of the two spring-loaded angled fingers not extending partially into the channel of the adaptor. FIG. 10C shows a top view of the adaptor illustrating the two spring-loaded angled fingers extending partially into the channel of the adaptor, according to an embodiment of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, etc.

Figure 1:
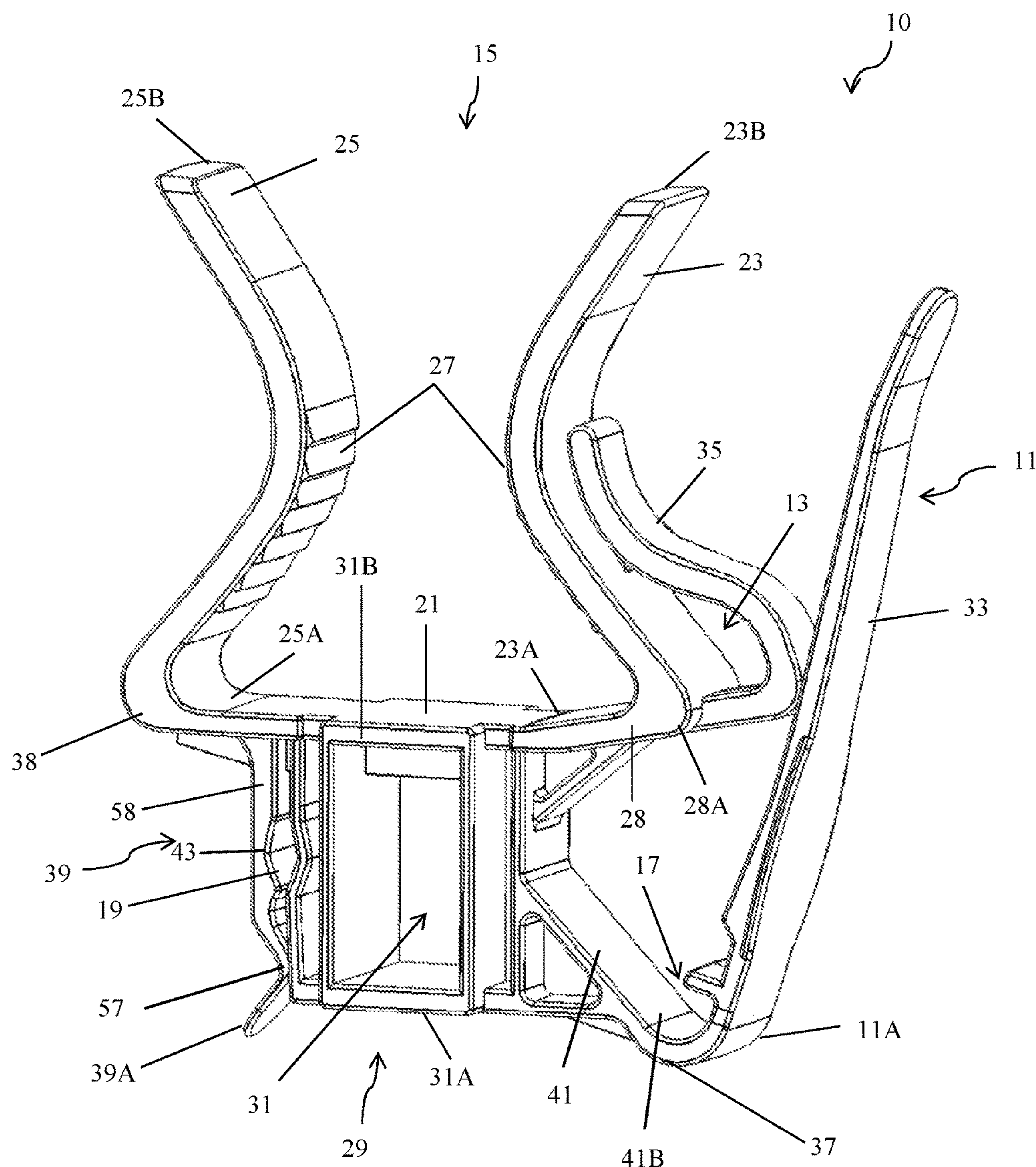
FIG. 1 perspective view of an upward facing clip that illustrates an eave clip portion of the clip, according to an embodiment of the present disclosure.

FIG. 1 shows a perspective view of an upper facing view of a clip 10 that can be attached to a variety of different surfaces, such as gutters, roofs, roof fascia, eaves, shingles, walls and the like. The clip 10 includes a gutter/shingle clip portion 11, an eave/shingle clip portion 15 and three different light string attachment portions, 13, 17, and 19. Of the three different light string attachment portions 13, 17, and 19, one 19 located a side of the eave clip portion 15 and two 13, 17 are located on another side of the eave clip portion 15.

Figure 2:
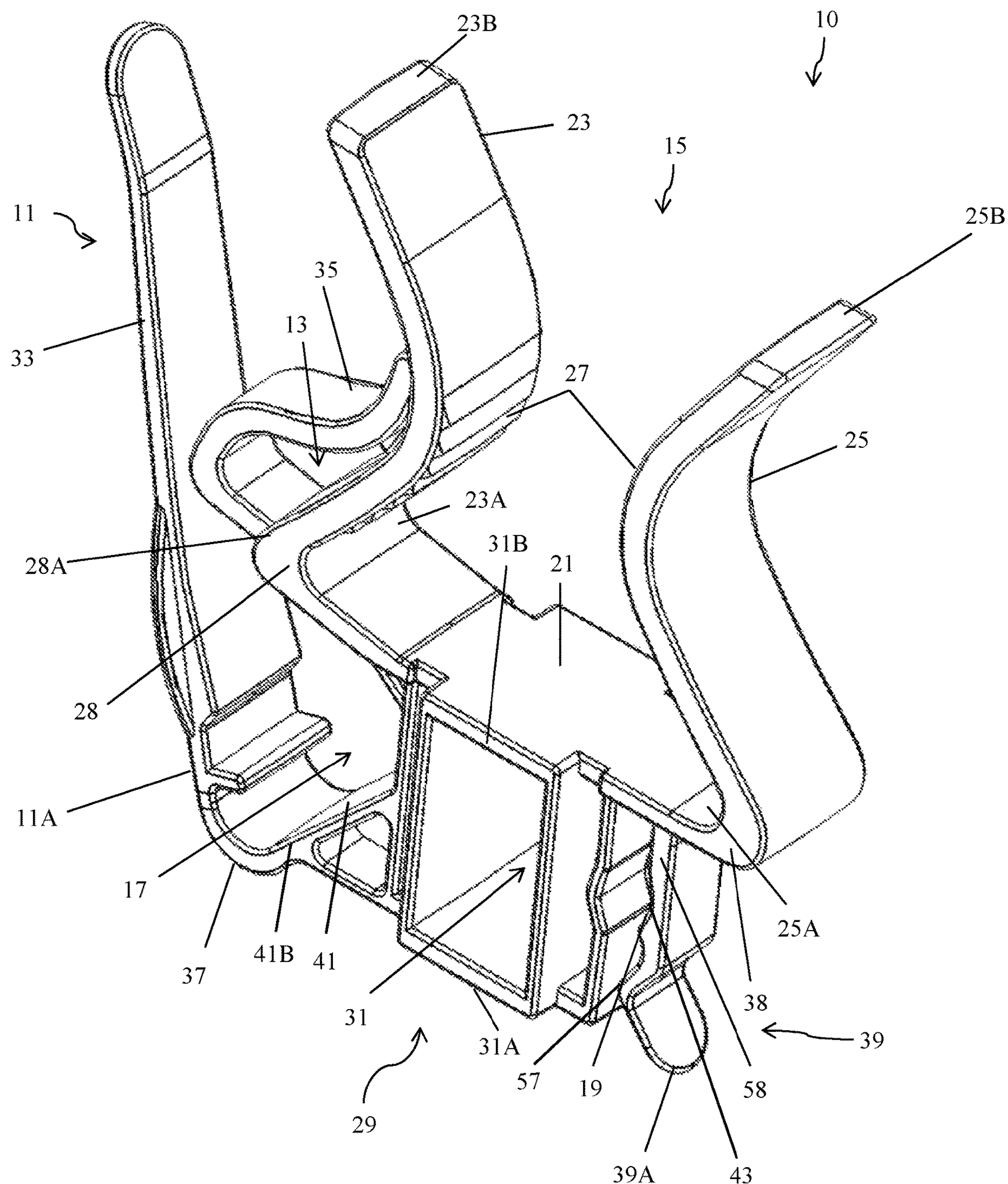
FIG. 2 is a second perspective view of an upward facing clip that illustrates an eave clip portion of the clip, according to an embodiment of the present disclosure.

FIG. 2 is a second perspective view of FIG. 1 also illustrating an upward facing clip that shows an eave clip portion 15 of the clip 10.

Eave Clip Portion

Referring to FIG. 1 and FIG. 2, the eave clip portion 15 is substantially an open hour-glass shaped having a bottom section 21, a first leg section 23, and a second leg section 25. In an embodiment, the first leg section 23 is perpendicular to the bottom section 21. The first leg section 23 includes a proximal end 23A, a distal end 23B and an arm section 28. Wherein, the first leg section 23, while being perpendicular to the bottom section 21, includes an angle or bend (with the apex of the bend/vertex of the angle being directed toward the second leg section 25) located between the proximal end 23A and the distal end 23B. Like the first leg section 23, the second leg section 25 is generally perpendicular to the bottom section 21. The second leg section 25 includes a proximal end 25A, a proximal end 25B and an arm section 38. Also, like the first leg section 23, the second leg section 25 includes an angle or bend (with the apex of the bend/vertex of the angle being directed toward the first leg section 23), which is substantially similar to the angle or bend in the first leg section 23 and is located between the proximal end 25A and the distal end 25B. Thus, the apexes of the bend/vertex of the angle of both the first and second leg sections 23, 25 are directed toward each other, so as to form the open hour-glass shape. It is possible that the eave clip portion 15 can be made from a slightly flexible material, such as plastics and polymers, wherein the bends in the first and/or second leg sections, 23 and 25, provide a biasing force that acts on anything inserted between them, such as a gutter, roof fascia, or the like.

Still referring to FIG. 1, the first and second leg sections 23, 25, may include at least one rib or barb 27, located on the inward surface of the apex of the slight bend or angle of the eave clip portion 15. At least one rib or barb 27 is provided, wherein the at least one rib or barb 27 can increase the resistance of the eave clip portion 15 to unwanted movement. It is contemplated that the at least one rib or barb 27 can be a plurality of ribs or barbs, as well as other like shapes incorporated either during manufacture or after manufacture that can provide an increase in resistance of the second clip portion 15 to unwanted movement. Further, it is possible other aspects may be incorporated to increase the resistance of the eave clip portion 15 to unwanted movement, such as, a textured sealant, a textured tape, or the like, applied to the area approximate the at least one rib or barb 27, or other areas on surfaces of the clip 10 that may be in need of such aspects.

Figure 3:
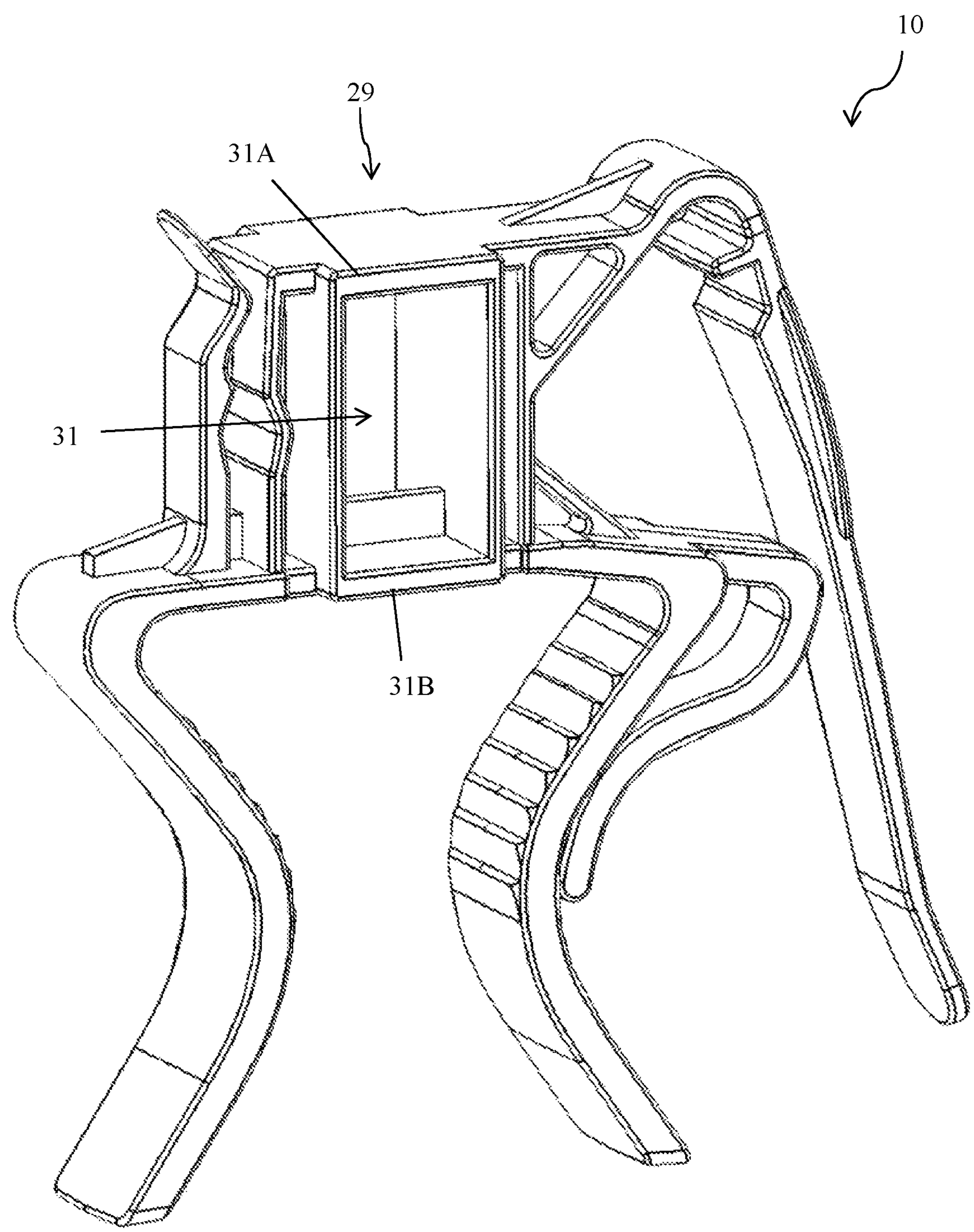
FIG. 3 is a third perspective view of an downward facing clip that illustrates a gutter/shingle clip portion of the clip, according to an embodiment of the present disclosure.
Figure 4:
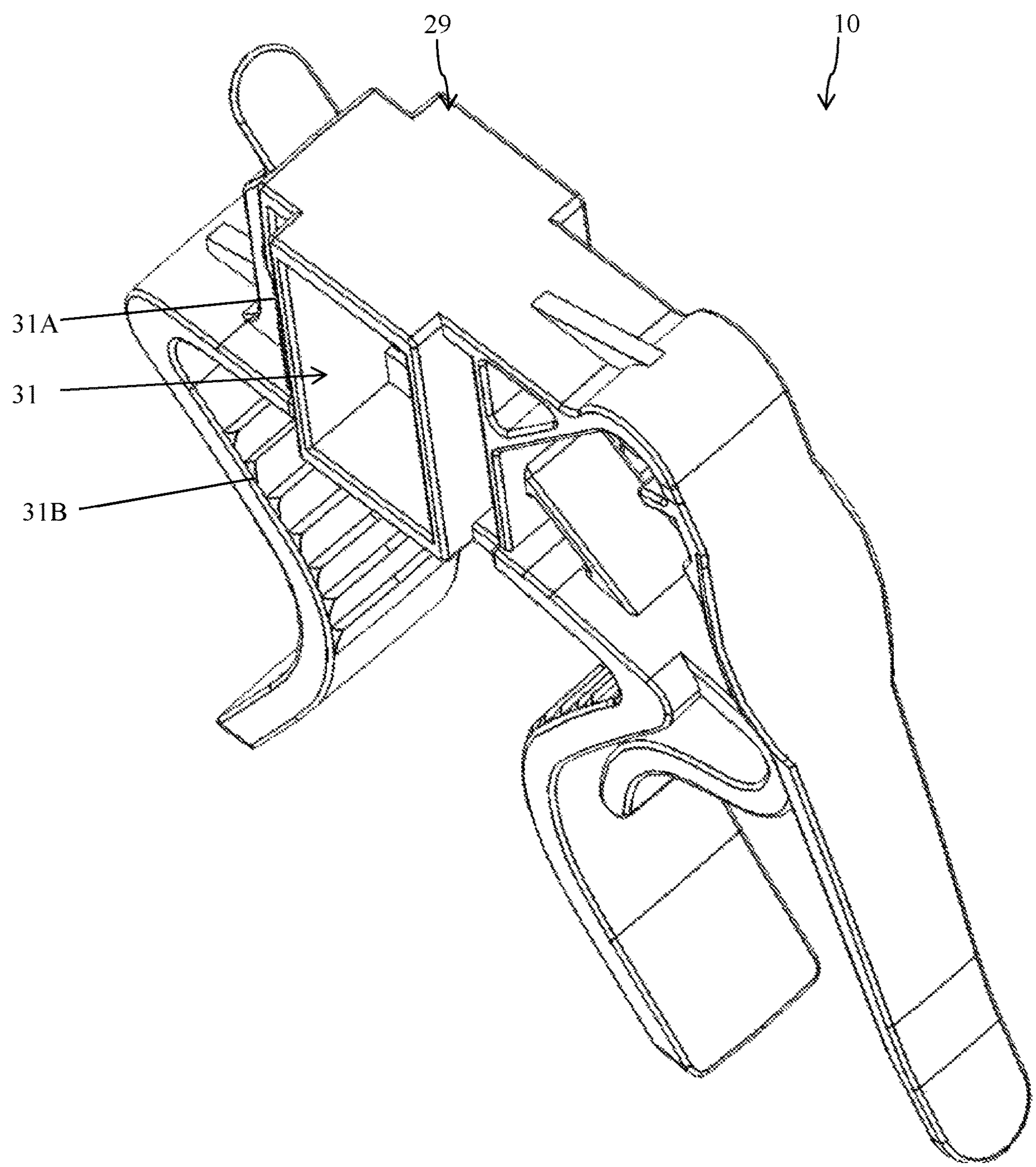
FIG. 4 is a fourth perspective view of an downward facing clip that illustrates a gutter/shingle clip portion of the clip, according to an embodiment of the present disclosure.

Still referring to FIG. 1, the eave clip portion 15 further comprises a pole adaptor attachment section 29 located approximately below the bottom section 21 of eave clip portion 15. The pole adaptor attachment section 29 is configured to include at least one cavity section 31 that projects downward from the bottom section 21. The cavity section 31 is structured and arranged to engage with an adaptor fixed to a clip pole mounting assembly, so as to secure the clip 10 in preparation for being mounted to a surface, such as a gutter, eve or shingle of a building. The cavity section is a uniform shape, such as a rectangle. The cavity section 31 of the pole adaptor attachment section 29 of FIG. 1 is configured to attach to the clip 10 in both an upper facing position as shown in FIG. 1, as well as in a downward facing position as shown in FIG. 3 and FIG. 4. The cavity section 31 is provided to allow the pole adaptor attachment section 29 to be first received by the adaptor of the clip pole mounting assembly at a distal end 31B of the cavity section 31 when the clip 10 is in an upper ward facing position (i.e. FIG. 1 and FIG. 2), and/or at a proximal end 31A of the cavity section 31 when the clip 10 is in an downward facing position (i.e. FIG. 3 and FIG. 4).

FIG. 3 is a third perspective view of a downward facing clip that illustrates a gutter/shingle clip portion of the clip 10. FIG. 4 is a fourth perspective view of an downward facing clip that illustrates a gutter/shingle clip portion of the clip. FIG. 3 and FIG. 4 illustrate the cavity section 31 is provided to allow the pole adaptor attachment section 29 to be first received by the adaptor of the clip pole mounting assembly at a distal end 31B of the cavity section 31 when the clip 10 is in an upper ward facing position (i.e. FIG. 1 and FIG. 2), and/or at a proximal end 31A of the cavity section 31 when the clip 10 is in an downward facing position (i.e. FIG. 3 and FIG. 4).

User Installing Clip to an Eave of a Building from a Ground Level Position

Figure 5A:
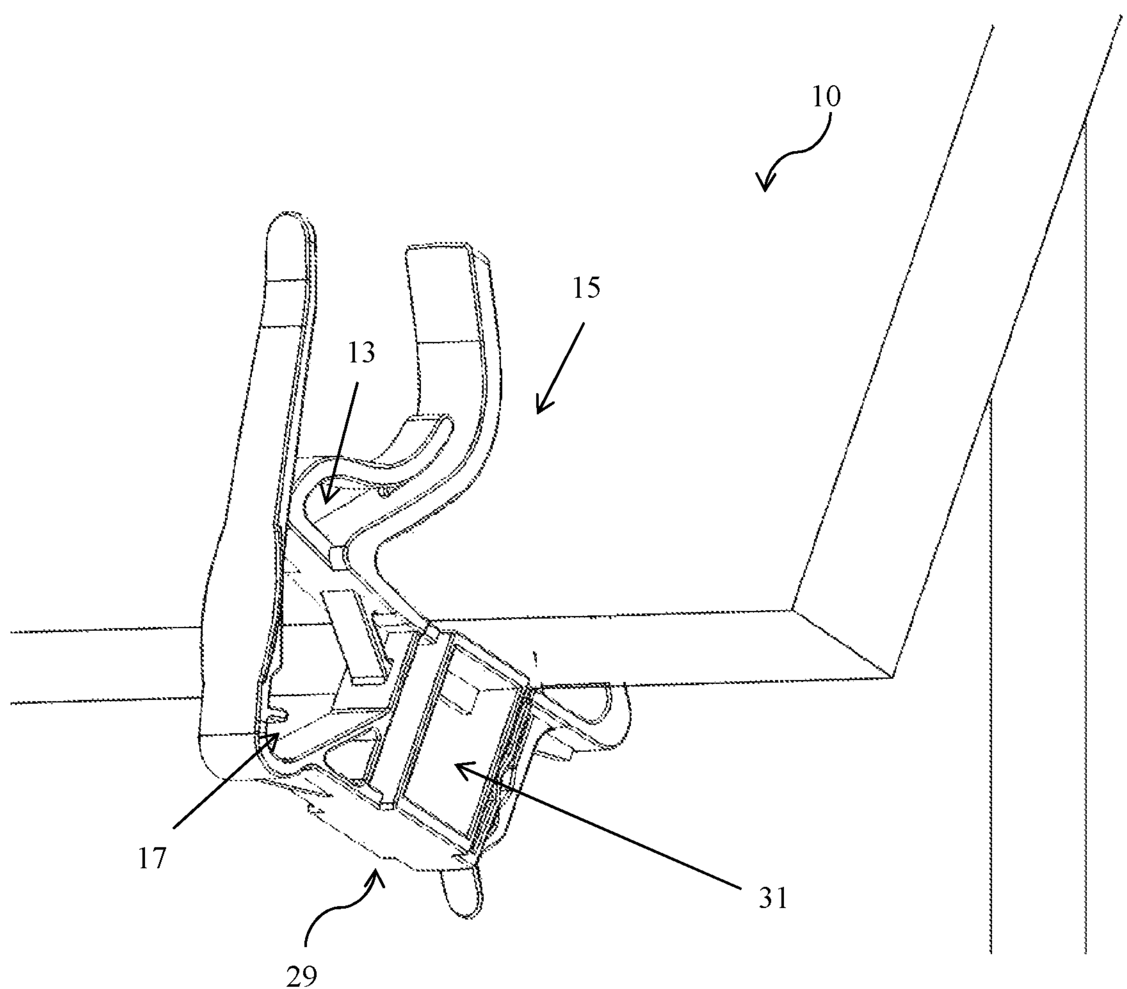
FIG. 5A illustrates a perspective view of the multifunctional clip 10 of FIG. 1 and FIG. 2 attached to an eave of a building, according to an aspect of the present disclosure.

FIG. 5A illustrates the multifunctional clip 10 of FIG. 1 and FIG. 2 attached to an eave of a building, according to an aspect of the present disclosure. In use, the user attaches the clip 10 in an upward facing position to the clip pole mounting assembly while the user is at a ground level position. The user then attaches the clip 10 to a location substantially above ground level onto an eave of a building with the assistance of the the clip pole mounting assembly. For example, the cavity section 31 of the pole adaptor attachment section 29 of clip 10 is inserted into the light mourning while the clip 10 is in an upward facing position, so as to secure the clip 10 to the clip pole mounting assembly. From a ground level position, the user then attaches the eave clip portion 15 to an cave of a building, i.e. not gutters, to attach the clip 10 to the eave of a building. For example, the user by forcing the eave clip portion 15 onto an eave of a building, the cave clip portion 15 receives the cave of the building. Once the cave clip portion 15 has been secured in placed on the cave, the user then presses a handle trigger located at an end of the clip pole mounting assembly to release the clip, thereby leaving the entire clip 10 attached to the cave of a building. Removal of the clip 10 is merely the reverse of the above or it may be removed by hand without use of the clip pole mounting assembly. Before clip 10 has been secured to an eave of the building, one or more linear systems such as ornamental light bulb sockets, misting systems, signs, banners and the like, can be attached to one of two light string attachment portions 13 or 17.

Figure 12:
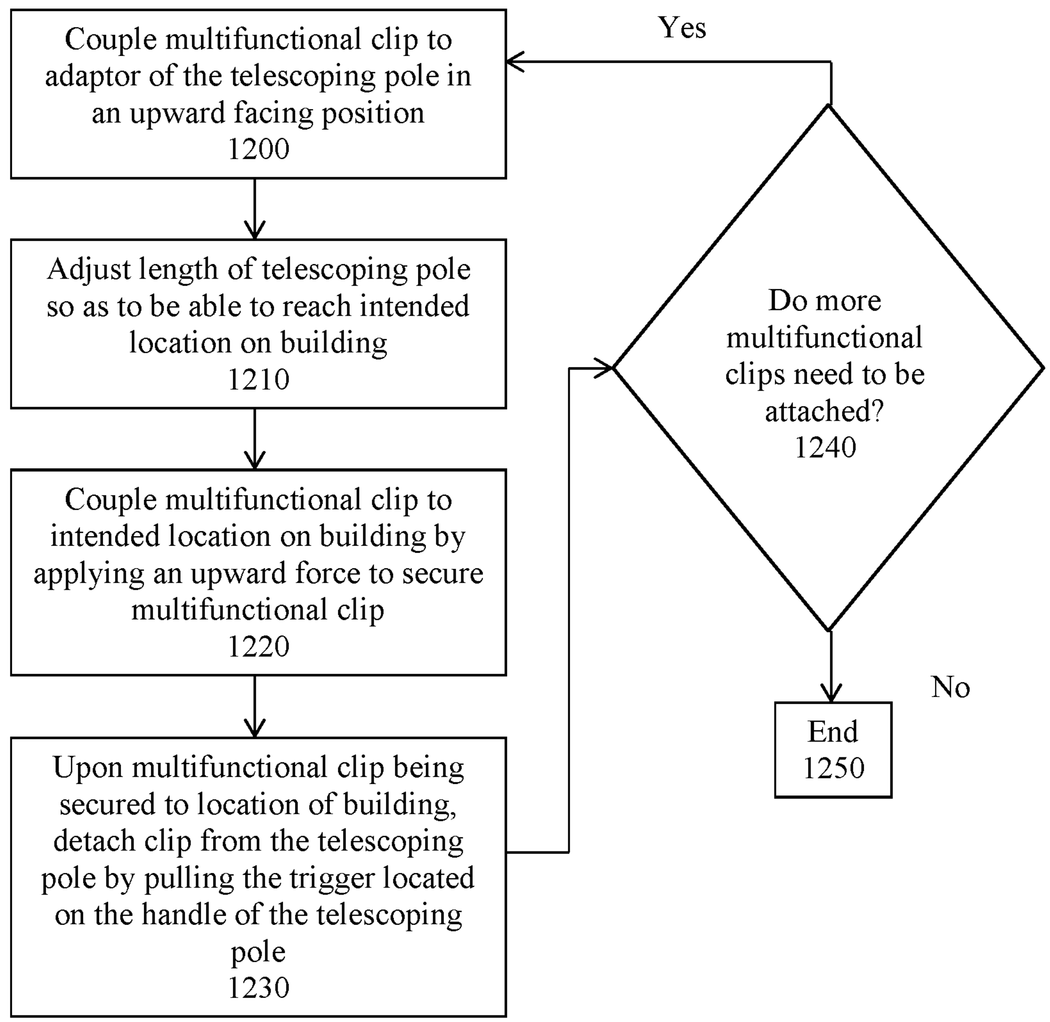
FIG. 12 is a flowchart of an embodiment of a process to attach a multifunctional clip (that is in an upward facing position on the adaptor of clip pole mounting assembly) to an intended location on a building structure from a ground level location, in accordance with an embodiment of the present disclosure.

FIG. 12 discloses a flowchart for coupling the the multifunctional clip 10 of FIG. 1 and FIG. 2 to an eave of a building, in accordance with FIG. 5A.

Gutter/Shingle Clip Portion

FIG. 1 and FIG. 2 show perspective views of the clip 10 that is upward facing position which can be attached to a variety of different surfaces, such as gutters, roofs, roof fascia and shingles and the like. The gutter/shingle clip portion 11 includes an arm 41 that projects away from the pole adaptor attachment section 29. At a distal end 41B of the arm 41, a leg 33 projects at an acute angle to an approximate direction of the arm 41 and in the same direction as the distal end 23B of the first leg section 23 projects. Thus, the leg 33 projects at an acute angle to the pole adaptor attachment section 29, but displaced in space by a length of the arm 41. Further, at an approximate proximal end 11A of the gutter clip portion 11 can include a slight angular bend 37 away from the pole adaptor attachment section 29 of clip 10, in order to further aid in the receipt of a surface, such as a lip of a gutter. It is possible the arm 41 and/or leg 33 of the gutter/shingle clip portion 11 can include at least one rib(s) or barb(s) (not shown) located for example, on the inward surface of the apex of the slight bend or angle. At least aspect of the at least one rib(s) or barb(s) is providing for an increase in the resistance of the clip portion 15 to unwanted movement.

Still referring to FIG. 1 and FIG. 2, the gutter/shingle clip portion 11 can also include a gutter lip retention tab 35 that is located at a distal end 28A of arm 28 of the first leg section 23 and adjacent the leg 33. In a preferred embodiment, the gutter lip retention tab 35 is shaped, such as a hook shape, in order to provide a smooth continuous surface that aids receipt of a lip of a surface, i.e. a gutter. Other shapes for the gutter lip retention tab 35 may be used and still fall within the scope of the present invention. It is contemplated that the leg 33 of the gutter/shingle clip portion 11 can be positioned to be in contact or approximate to the gutter lip retention tab 35. The gutter lip retention tab 35 further includes a light string attachment portion 13 located between an inside surface of the gutter lip retention 35 and an outside surface of the first leg section 23 of eave clip portion 15.

It is possible that the gutter/shingle clip portion 11 and the gutter lip retention tab 35 can be made from a slightly flexible material, such as plastics and polymers, wherein the bends in the leg 33 the gutter/shingle clip portion 11 and the gutter lip retention tab 35, provide a biasing force that acts on anything inserted between them, such as a gutter, roof fascia, or the like. Further, this flexibility in the gutter lip retention tab 35 allows for expandability in order to receive differently sized items within the light string attachment portion 13, such as ornamental light bulb sockets, misting systems, signs, banners and the like. The inclusion of the flexible light string attachment portion 13 makes the gutter lip retention tab 35 a multi-use element, i.e., among other things, (1) a biasing force that acts on anything inserted between the gutter/shingle clip portion 11 and the gutter lip retention tab 35; and (2) expandability of flexible light string attachment portion 13 in order to receive differently sized items within the light string attachment portion 13. It is possible the gutter lip retention tab 35 can include at least one rib(s) or barb(s) (not shown) located for example, on the inward surface of the gutter lip retention tab 35, wherein the at least one rib(s) or barb(s) can provide for an increase in a resistance of the light string attachment portion 13 to unwanted movement.

Still referring to FIG. 1 and FIG. 2, the clip 10 includes a flex segment 39 having an arm 58 attached to the underside of the bottom section 21 of eave clip portion 15 that projects downward, and is located on the same side and underneath the proximal end 25A of the second leg section 25. The flex segment 39 further includes a light string attachment portion 19 located between an inside surface of the flex segment 39 and an outside surface of the pole adaptor attachment section 29 of clip 10. At a distal end 39A of the flex segment 39 includes a slight angular bend 57 away from the pole adaptor attachment section 29 of clip 10, in order to further aid in the receipt of linear systems, such as ornamental light bulb sockets, misting systems, signs, banners and the like. It is possible that the flex segment 39 can be made from a slightly flexible material, such as plastics and polymers, wherein the bends in the flex segment 39, provide a biasing force that acts on anything inserted between flex segment 39 and the pole adaptor attachment section 29 of clip 10, such as ornamental light bulb sockets, misting systems, signs, banners and the like. It is possible the flex segment 39 can include at least one rib(s) or barb(s) (not shown) located for example, on the inward surface of the flex segment 39, wherein the at least one rib(s) or barb(s) can provide for an increase in a resistance of the light string attachment portion 19 to unwanted movement.

As noted above, the cavity section 31 is provided to allow the pole adaptor attachment section 29 to be first received by the adaptor of the clip pole mounting assembly at a distal end 31B of the cavity section 31 when the clip 10 is in an upward facing position.

User Installing Clip to a Shingle of a Budding from Ground Level Position

Figure 5B:
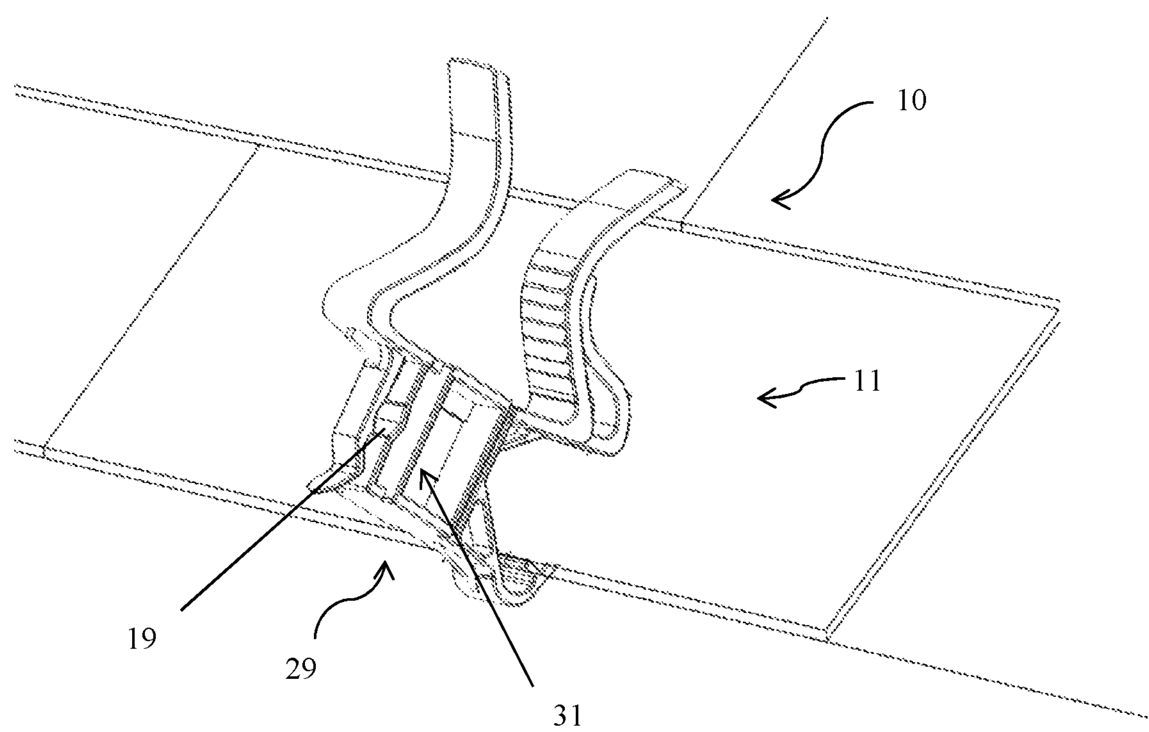
FIG. 5B illustrates the multifunctional clip of FIG. 1 and FIG. 2 attached to a shingle of a building, according to an aspect of the present disclosure.

FIG. 5B illustrates the multifunctional clip 10 of FIG. 1 and FIG. 2 attached to a shingle of a building, according to an aspect of the present disclosure. In use, the user attaches the clip 10 in an upward facing position to the clip pole mounting assembly while the user is at a ground level position. The user then attaches the clip 10 to a location substantially above ground level underneath a shingle of a building with the assistance of the the clip pole mounting assembly. For example, the cavity section 31 of the pole adaptor attachment section 29 of clip 10 is inserted into the light mounting while the clip 10 in an upward facing position (i.e. FIGS. 1-2 and FIGS. 5-6), so as to secure the clip 10 to the clip pole mounting assembly. From a ground level position, the user then attaches the gutter/shingle clip portion 11 underneath the shingle of a building, to attach the clip 10 to the shingle of a building. For example, the user by forcing the gutter/shingle clip portion 11 underneath of the shingle of a building, the gutter/shingle clip portion 11 receives the shingle of the building. Once the gutter/shingle clip portion 11 has been secured in placed underneath the shingle, the user then presses a handle trigger located at an end of the clip pole mounting assembly to release the clip, thereby leaving the entire clip 10 attached to underneath of the shingle of a building. Removal of the clip 10 is merely the reverse of the above or it may be removed by hand without use of the clip pole mounting assembly. Before clip 10 has been secured underneath of the building, one or more linear systems such as ornamental light bulb sockets, misting systems, signs, banners and the like, can be attached to the light string attachment portions 19.

FIG. 12 discloses a flowchart for coupling the the multi-functional clip 10 of FIG. 1 and FIG. 2 to a shingle of a building, in accordance with FIG. 5B.

User Installing Clip to a Gutter of a Budding from Ground Level Position

Figure 5C:
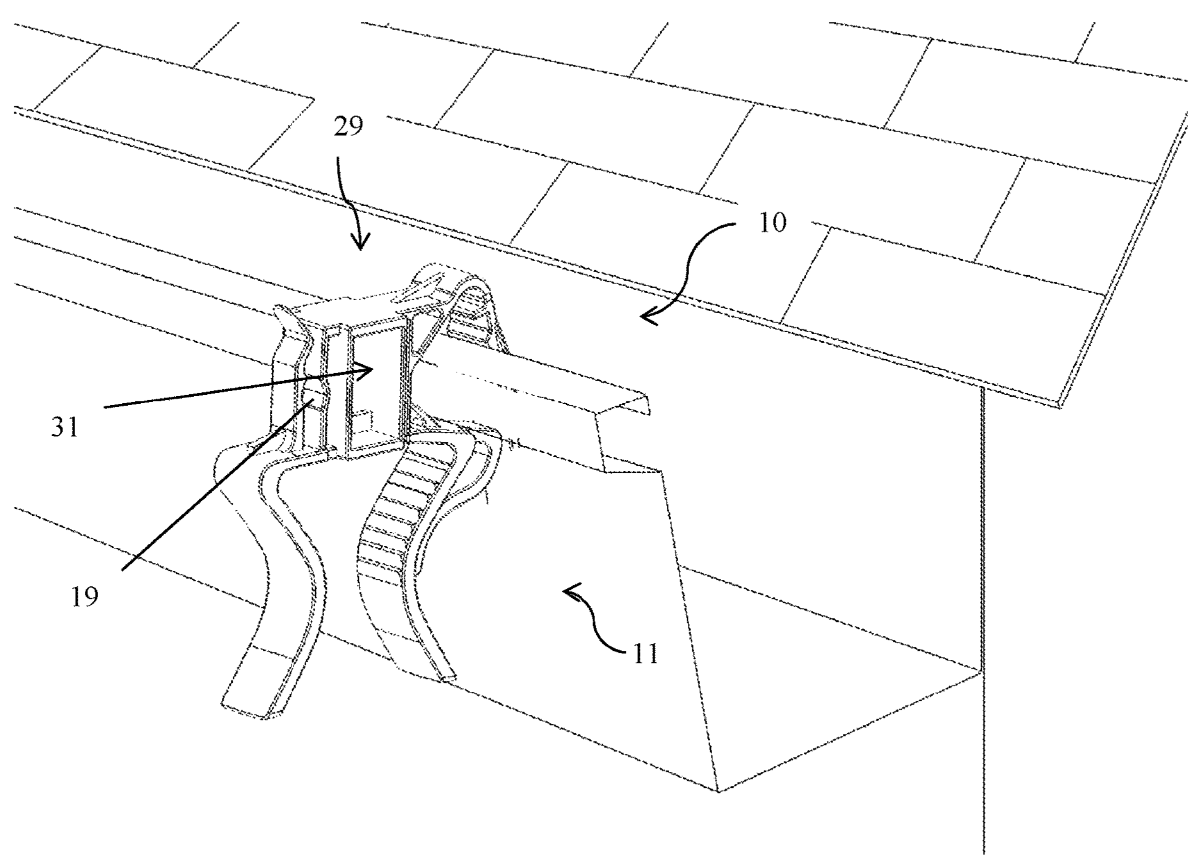
FIG. 5C illustrates the multifunctional clip of FIG. 1 and FIG. 2 attached to a gutter of a building, according to an aspect of the present disclosure.

FIG. 5C illustrates the multifunctional clip 10 of FIG. 3 and FIG. 4 attached to a gutter of a building, according to an aspect of the present disclosure. In use, the user attaches the clip 10 in a downward facing position to the clip pole mounting assembly while the user is at a ground level position. The user then attaches the clip 10 to a location substantially above the ground level onto a gutter of a building with the assistance of the the clip pole mounting assembly. For example, the cavity section 31 of the pole adaptor attachment section 29 of clip 10 is inserted into the clip pole mounting assembly while the clip 10 in an downward facing position (i.e. FIG. 3 and FIG. 4), so as to secure the clip 10 to the clip pole mounting assembly. The user then attaches the gutter/shingle clip portion 11 to the gutter, when the clip 10 is in a downward facing position (while attached to the clip pole mounting assembly). When installing the clip 10 to the gutter, the user by pulling the gutter/shingle clip portion 11 down onto the gutter of a building, so the gutter/shingle clip portion 11 receives the gutter of the building, the clip 10 can be secured to the gutter. Once the gutter/shingle clip portion 11 has been secured in placed on the gutter, the user then presses a handle trigger at an end of the clip pole mounting assembly to release the clip, thereby leaving the entire clip 10 attached to the gutter of a building. Removal of the clip 10 from either the gutter is merely the reverse of the above steps or it may be removed by hand without use of the clip pole mounting assembly. Before clip 10 has been secured to the gutter of the building, one or more linear systems such as ornamental light bulb sockets, misting systems, signs, banners and the like, can be attached to the light string attachment portion 19.

Figure 13:
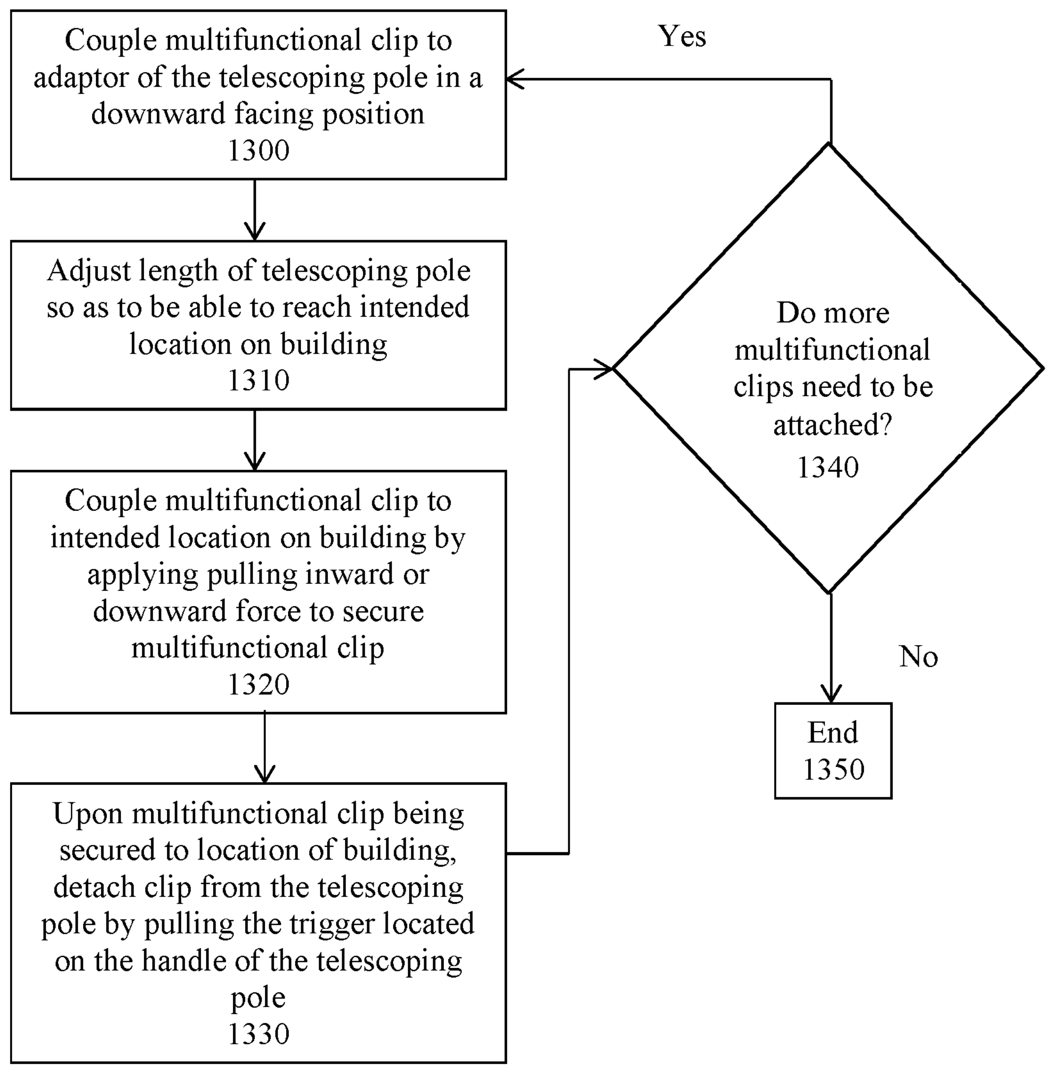
FIG. 13 is a flowchart of an embodiment of a process to attach a multifunctional clip to an intended location on a building structure, when the multifunctional dip in attached to the adaptor of the clip pole mounting assembly in a downward facing position, in accordance with an embodiment of the present disclosure.

FIG. 13 discloses a flowchart for coupling; the the multifunctional clip 10 of FIG. 1 and FIG. 2 to a gutter of a building, in accordance with FIG. 5C.

Installing Clip from a Position "Above" an Intended Install Shingle Location

FIG. 5C illustrates the multifunctional clip 10 of FIG. 3 and FIG. 4 attached to a shingle of a building, according to an aspect of the present disclosure. FIG. 3 and FIG. 4 illustrate the multifunctional clip 10 in a downward facing position. The clip 10 may be attached to a shingle of a building from a position located above the intended install location of the clip 10, whereby a user is located on a roof or in a window of the building. In the instance where the user is located above the intended install location of the clip 10, in use, the user attaches the clip 10 in a downward facing position (i.e. FIG. 3 and FIG. 4), to the clip pole mounting assembly prior to install of the clip 10. The user then attaches the clip 10 to a location substantially below their current position onto a shingle of a building with the assistance of the the clip pole mounting assembly. For example, the user by forcing the gutter/shingle clip portion 11 underneath the shingle of a building, the gutter/shingle clip portion 11 is secured underneath the shingle of the building. Once the gutter/shingle clip portion 11 has been secured in placed underneath shingle, the user then presses a handle trigger located at an end of the clip pole mounting assembly to release the clip, thereby leaving the entire clip 10 attached to the shingle of the building. Removal of the clip 10 is merely the reverse of the above or it may be removed by hand without use of the dip pole mounting assembly. Before clip 10 has been secured to the shingle of the building, one or more linear systems such as ornamental light bulb sockets, misting systems, signs, banners and the like, can be attached to the light string attachment portion 19.

FIG. 13 discloses a flowchart for coupling the the multifunctional clip 10 of FIG. 1 and FIG. 2 to a shingle of a building, in accordance with FIG. 5C.

Clip Pole Mounting Assembly

Figure 6:
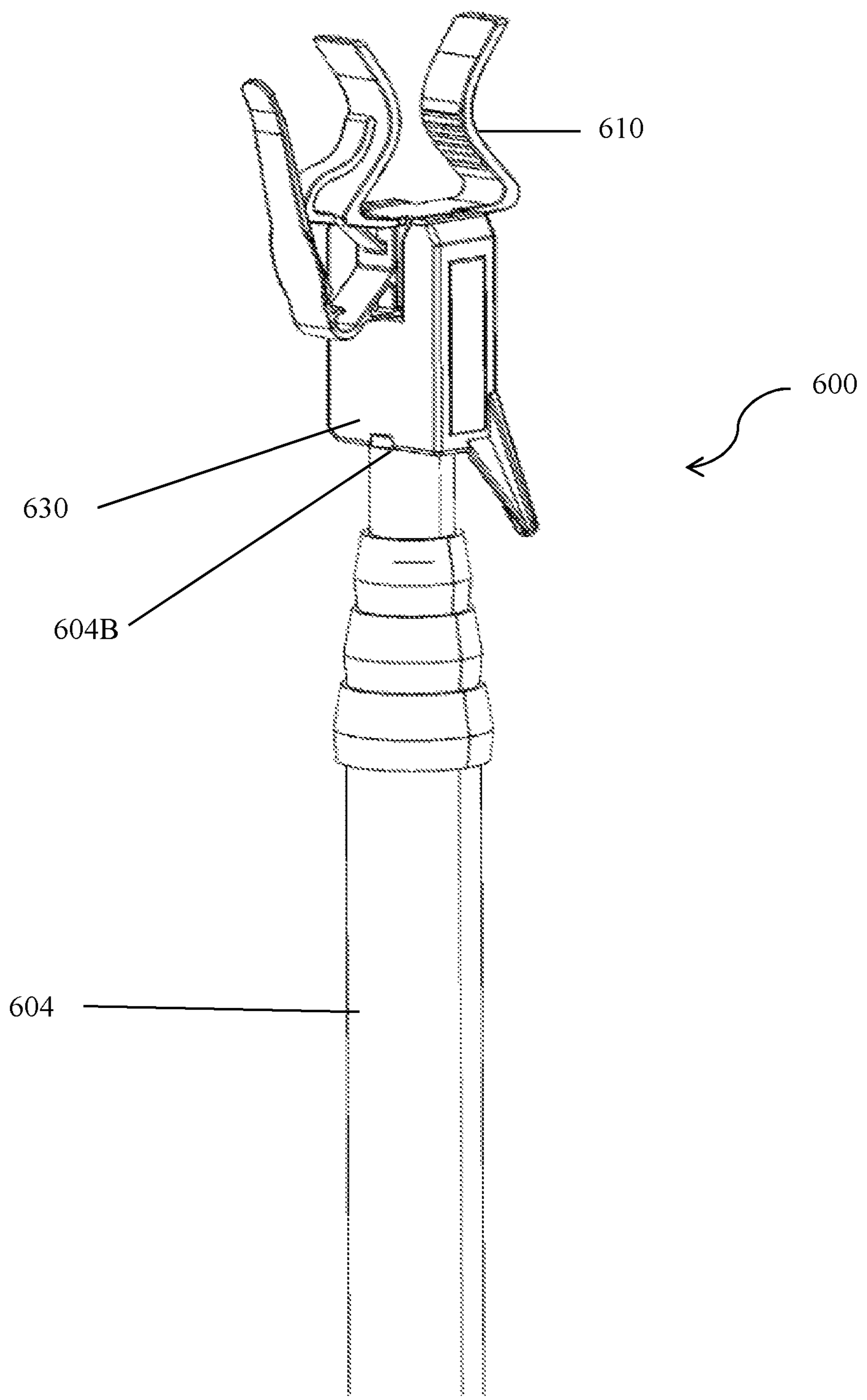
FIG. 6 is a perspective view of a clip pole mounting assembly including a telescoping pole, an adaptor fixed to the telescoping pole and a multifunctional clip attached to the adaptor, according to an embodiment of the present disclosure.

FIG. 6 illustrates an embodiment of a clip pole mounting assembly 600 with a multifunctional clip 610 as disclosed in FIG. 1, coupled to the clip pole mounting assembly 600, according to another embodiment of the present disclosure. The clip pole mounting assembly 600 includes a telescoping pole 604, a fixed adaptor 630 fixed at the distal most end 604B of the telescoping pole 604, and a detachable multifunctional clip 610 which is attachable and detachable to the fixed adaptor 630.

Still referring to FIG. 6, the telescoping pole 604 may have an adjustable length, such as between approximately two feet to eight feet. It is contemplated that the length of the telescoping pole 604 can have a fully extended range between (8) eight feet to (26) twenty-six feet. However, a telescoping range can include approximately (2) two feet to a maximum telescoping length of (8) eight feet, (9) nine feet, (10) ten feet or (12) twelve feet. A minimum length of the telescoping pole 604 may be defined by fully compressing the telescoping pole 604 and a maximum length of the telescoping pole 604 may be defined by fully extending the telescoping pole 604. The telescoping pole 604 may allow a user of the clip pole mounting assembly 600 to couple the multifunctional clip 610 to a surface, such as eaves, roof facia, gutters, shingles, of a building of different heights without the use of a ladder. For example, linear systems, such as ornamental/decorative lights, misting systems, signs, banners and other ornaments can be coupled to a multifunction clip(s).

Still referring to FIG. 6, the fixed adaptor 630 is fixed to the distal end 604B of the telescoping pole 604, such that the adaptor 630 is configured to engage and couple to the multifunctional clip 610. It is contemplated the adaptor 630 may be detachable, and replaceable with another adaptor like device. Further, it is possible the fixed adaptor 630 may be a universal type adaptor, such that the universal type adaptor could operationally couple to a multitude of different types of structurally configured clips, i.e. single or multifunctional. The fixed adaptor 630 will be described in greater detail below and in FIG. 10A, FIG. 10B and FIG. 10C.

Figure 7:
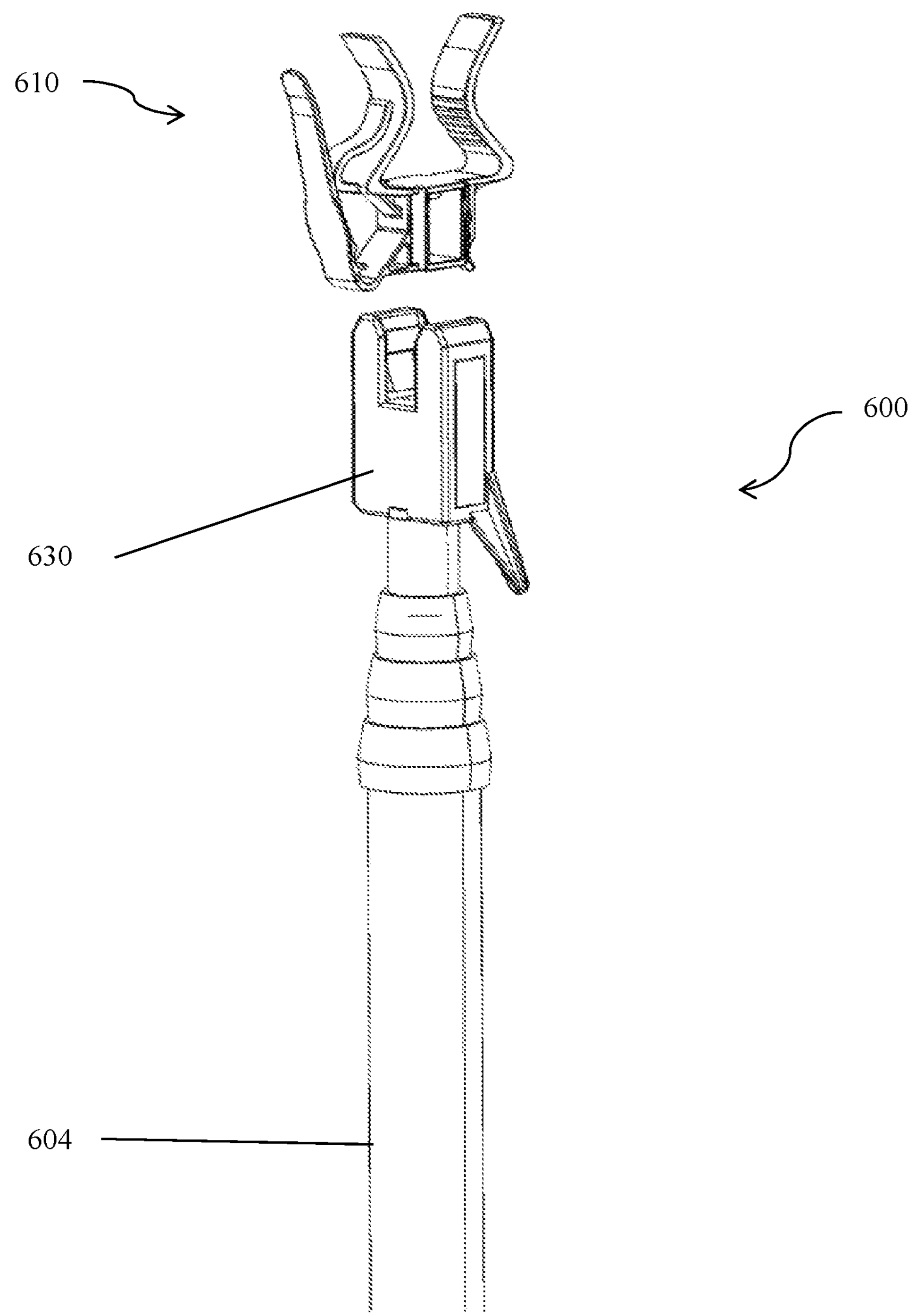
FIG. 7 is a perspective view of a clip pole mounting assembly including a telescoping pole, an adaptor fixed to the telescoping pole and a multifunctional clip not attached to the adaptor, according to an embodiment of the present disclosure.

FIG. 7 illustrates an embodiment of the clip pole mounting assembly 600 of FIG. 6, wherein the multifunctional clip 610 is detached from the clip pole mounting assembly 600. The multifunction clip 610 can be inserted into the adaptor 630 that is fixed to the telescoping pole 604 from either an upward facing position or a downward facing position, as noted above.

Figure 8:
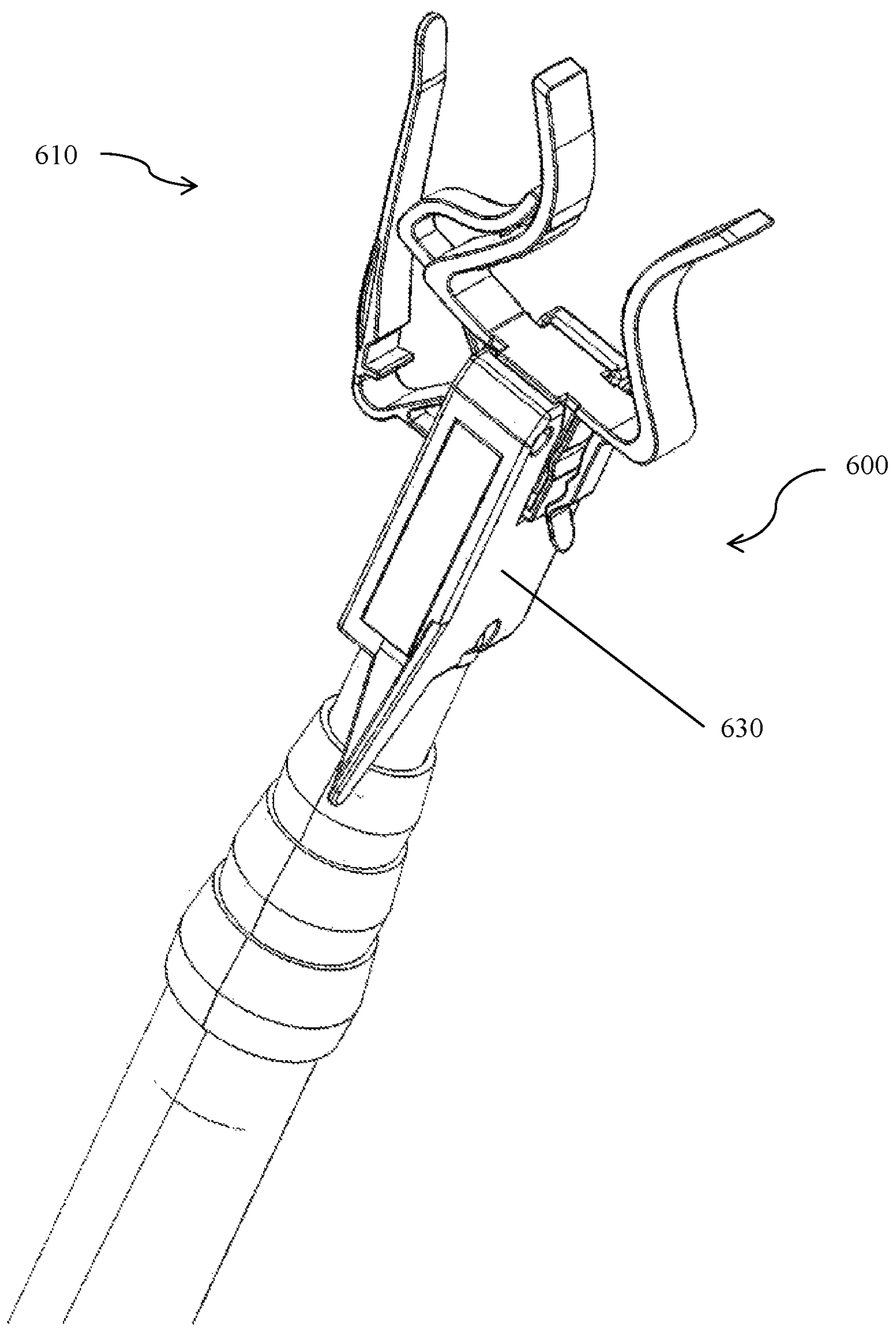
FIG. 8 is a perspective view of the adaptor fixed to the telescoping pole, according to an embodiment of the present disclosure.

FIG. 8 illustrates an embodiment of a clip pole mounting assembly 600 of FIG. 6, specifically a perspective view of the multifunction clip 610 inserted into the adaptor 630 in an upward facing position. The multifunction clip 610 is positioned in the upward facing position and engaged/inserted into the adaptor 630. Upon pulling of the trigger of the trigger release mechanism (i.e. located within the handle), the pulling of the trigger pulls back the spring-loaded angled fingers extending partially into a channel of the adaptor 630. Typically, after the multifunctional clip has been positioned on a surface, such as surface of a building, a user would pull the trigger to allow the multifunctional clip to be released from the clip pole mounting assembly 600 so as to remain on the choose surface of the building.

Figure 9:
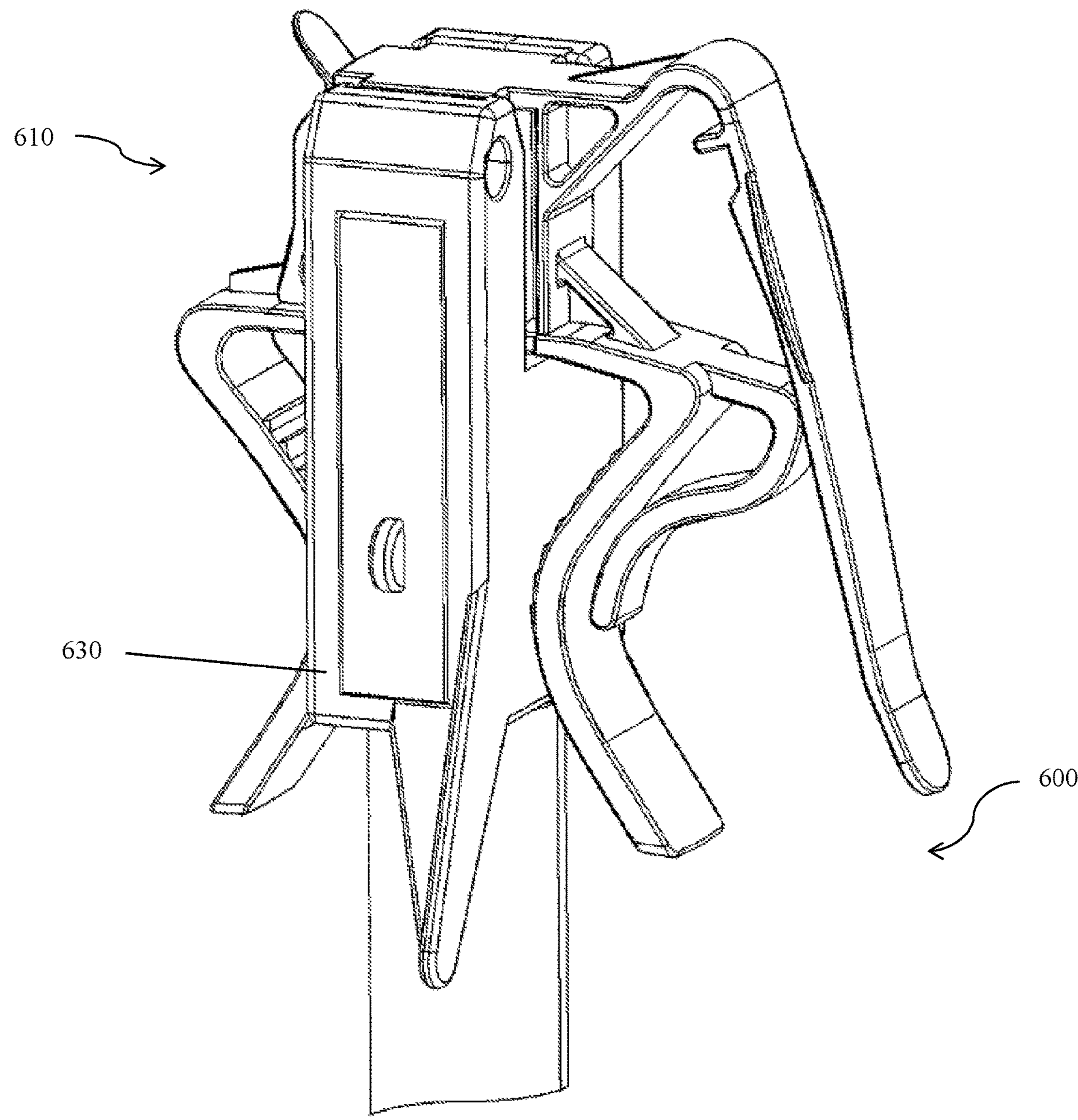
FIG. 9 illustrates a perspective view of the multifunction clip inserted into the adaptor in a downward facing position, according to an embodiment of the present disclosure.

FIG. 9 illustrates a perspective view of the multifunction clip 610 inserted into the adaptor 630 in a downward facing position (see FIGS. 3-4). The multifunction clip 610 is positioned in the downward facing position and engaged/inserted into the adaptor 630.

Figure 10A:
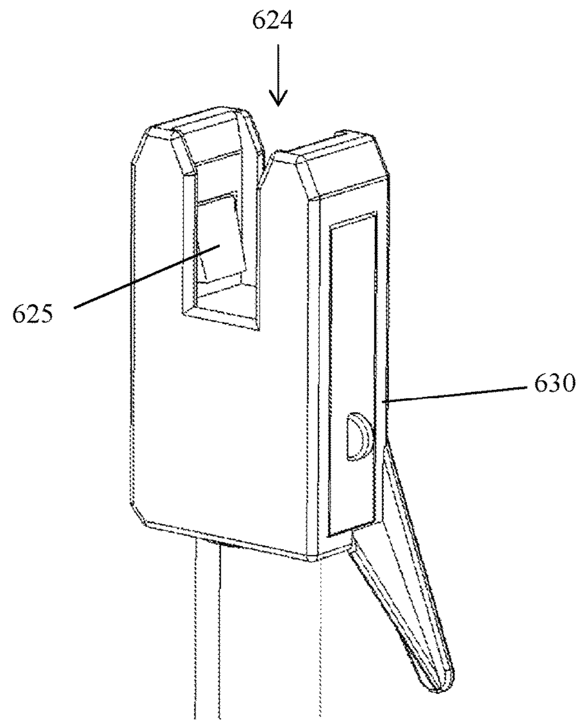
FIG. 10A, FIG. 10B, FIG. 10C are perspective views of the adaptor.
Figure 10B:
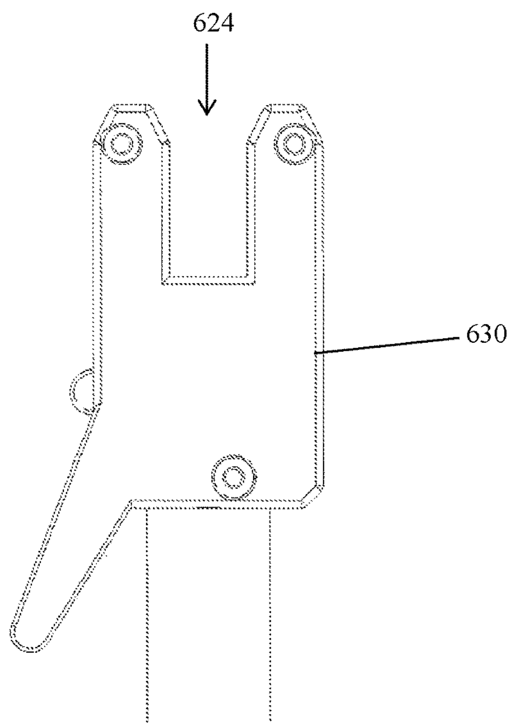
Figure 10C:
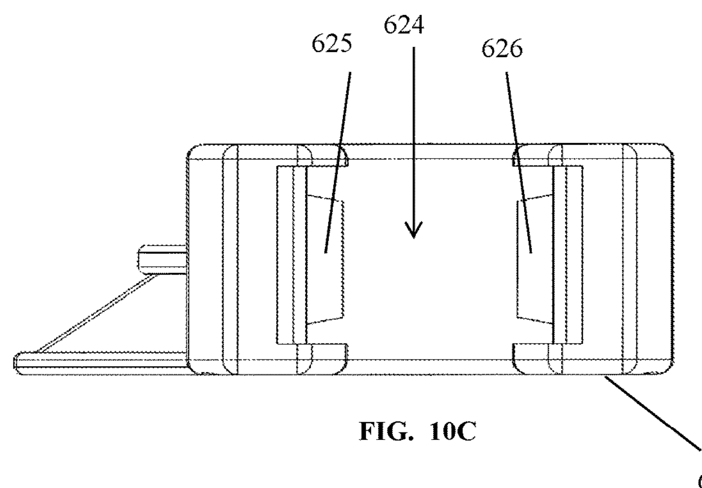

FIG. 10A, FIG. 10B and FIG. 10C illustrate views of the adaptor 630. FIG. 10A illustrates a perspective view of a spring-loaded angled finger 625 (i.e. spring-loaded angled finger 626 not shown) extending partially into the channel 624 of the adaptor 630. For example, when the two spring-loaded angled fingers are extending into the channel 624 of the adaptor 630, the trigger located on the handle is not being pulled and the two spring-loaded angled fingers are in a first position. Thus, the adaptor 630 is ready to receive the multifunctional clip to be inserted into the channel 624 of the adaptor 630.

In use, the multifunctional clip 610 is inserted into the channel 624, so the cavity section of the pole adaptor attachment section of the multifunctional clip 610 is allowed temporarily compress the two spring-loaded angled fingers (second position of two spring-loaded angled fingers. The two spring-loaded angled fingers are initially moved from their original position (or first position) to a compressed positioned (second position, i.e. where the two spring-loaded angled fingers become flush with the inner walls of the channel 624), so as to allow the multifunctional clip 610 to become fully engaged and coupled to the adaptor 630. Upon the multifunctional clip 610 being fully inserted, i.e. engaged and coupled to, the adaptor 630 within the channel 624, the two temporarily compressed spring-loaded angled fingers are sprung back to their original position (first position), thus locking or coupling the multifunctional clip 610, i.e., locking by two spring-loaded angled fingers extending into the cavity section 631 of the pole adaptor attachment section of the multifunctional clip 610. As noted above, the multifunctional clip 610 can engage the adaptor 630, at the distal end of the cavity section when the multifunctional clip 610 is in an upper ward facing position (i.e. FIGS. 6-13), and/or at the proximal end of the cavity section when the multifunctional clip 610 is in an downward facing position (i.e. FIG. 9), depending upon the application.

FIG. 10B shows a perspective of the adaptor 630 with the two spring-loaded angled fingers 625, 626 not extending partially into the channel 624 of the adaptor 630. When the two spring-loaded angled fingers are not extending into the channel 624 of the adaptor 630, the trigger located on the handle is being pulled and the two spring-loaded angled fingers are in the second position. Thus, the adaptor 630 is ready to release the multifunctional clip from the channel 624 of the adaptor 630, so the multifunctional clip can be positioned on a surface of a building.

FIG. 10C shows a top view of the adaptor 630 with the two spring-loaded angled fingers 625, 626 extending partially into the channel 624 of the adaptor 630. When the two spring-loaded angled fingers 625, 626 are extending into the channel 624 of the adaptor 630, the trigger located on the handle is not being pulled and the two spring-loaded angled fingers 625, 626 are in the first position. Thus, the adaptor 630 is ready to receive the multifunctional clip to be inserted into the channel 624 of the adaptor 630.

Figure 11A:
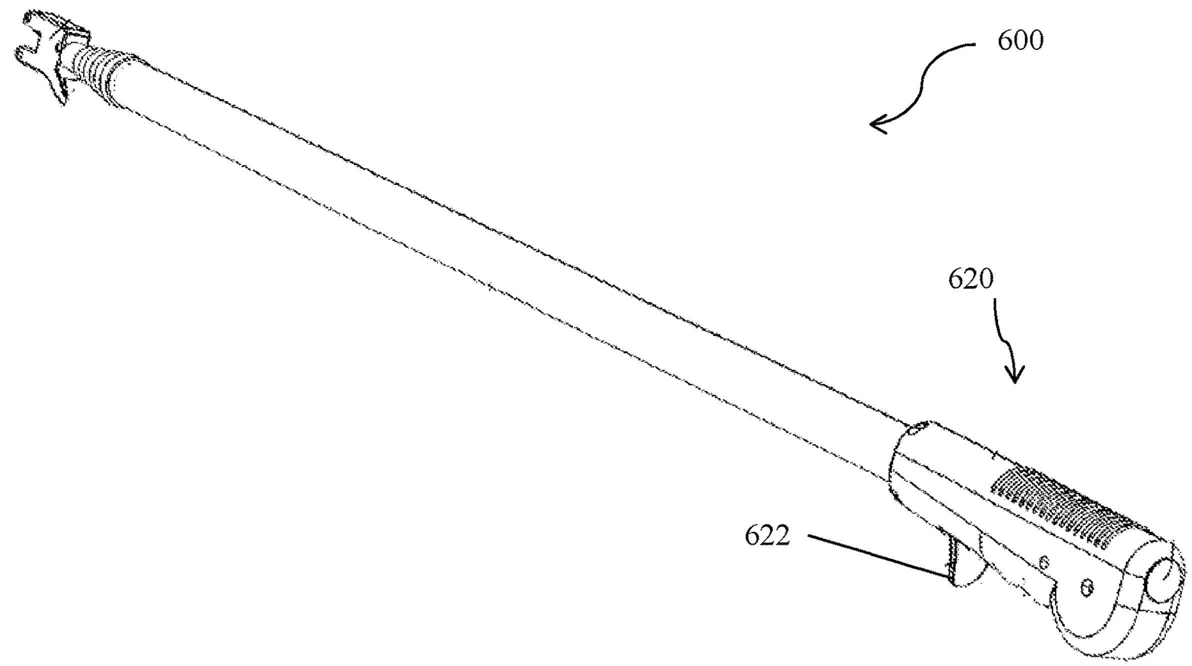
FIG. 11A and FIG. 11B illustrate perspective views of the handle having a trigger position located on the proximal end of the telescoping pole of the clip pole mounting assembly, according to an embodiment of the present disclosure.
Figure 11B:
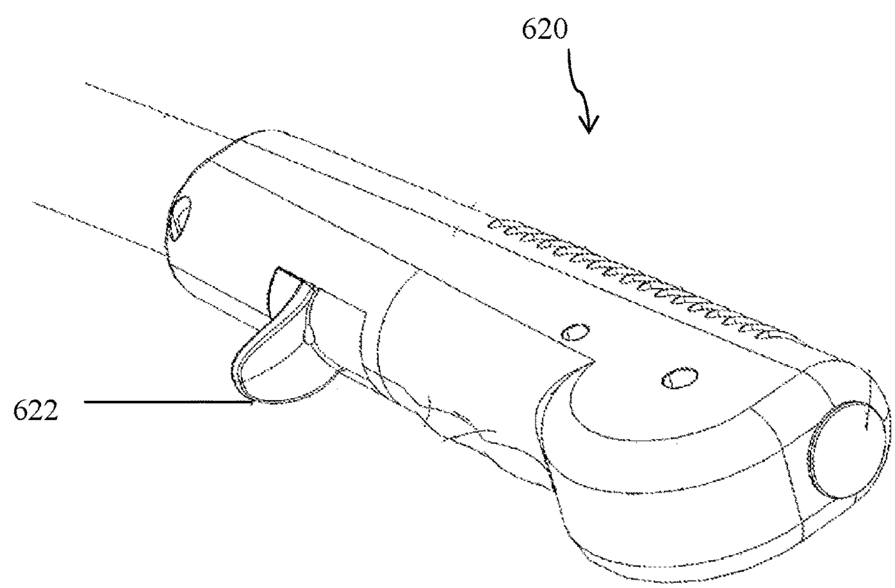

FIG. 11A and FIG. 11B illustrate the handle having a trigger 622 positioned on the handle 620 located on the proximal end of the clip pole mounting assembly 600. The trigger is in communication with the trigger release mechanism is incorporated into the handle 620. FIG. 11A shows a perspective view of the trigger on the handle located on the proximal end of the telescoping pole. FIG. 11B shows a perspective view of the handle with a grip texture and a form fitting handle. It is contemplated the handle can include various configurations so as to provide comfort when holding the handle.

FIG. 12 shows a flowchart for coupling the multifunctional clip to a building, according to an embodiment of the present disclosure. Specifically, FIG. 12 is a flowchart of a process to attach the multifunctional clip to an intended location on a building structure from a ground level location, when the multifunctional clip is attached to the adaptor of the clip pole mounting assembly in an upward facing position (i.e. FIG. 1 and FIG. 2).

In operation 1200, the multifunctional clip is coupled to adaptor of the telescoping pole in an upward facing position. The next step 1210 includes adjusting the length of the telescoping pole in accordance with the height of the intended location of the building from a ground position. The telescoping pole may be adjusted to have a length of between approximately two and twenty-six feet or two and eight feet. The next step 1220, the multifunctional clip is positioned under the approximate intended location on the building. Once approximately aligned, a substantially upward force is applied to the telescoping pole to couple the multifunctional clip to the intended location on the building. The next step 1230 upon the multifunctional clip being secured to the intended location on the building is to detach the multifunctional clip from the telescoping pole by pulling a trigger located on the handle of the telescoping pole. The next step 1240 is to determine if there are more multifunctional clips that need to be attached, the process returns to operation 1200. If there are no more multifunctional clips to attach, the process ends in step 1250.

FIG. 13 shows a flowchart for coupling the multifunctional clip to a building, according to an embodiment of the present disclosure. Specifically, FIG. 13 is a flowchart of a process to attach a multifunctional clip to an intended location on a building structure, when the multifunctional clip in attached to the adaptor of the clip pole mounting assembly in a downward facing position (i.e. FIG. 3 and FIG. 4).

In operation 1300, the multifunctional clip is coupled to adaptor of the telescoping pole in an upward facing position. The next step 1310 includes adjusting the length of the telescoping pole in accordance with the height of the intended location of the building from a ground position. The telescoping pole may be adjusted to have a length of between approximately two and twenty-six feet or two and eight feet. The next step 1320, the multifunctional clip is positioned under the approximate intended location on the building. Once approximately aligned, a substantially upward force is applied to the telescoping pole to couple the multifunctional clip to the intended location on the building. The next step 1330 upon the multifunctional clip being secured to the intended location on the building is to detach the multifunctional clip from the telescoping pole by pulling a trigger located on the handle of the telescoping pole. The next step 1340 is to determine if there are more multifunctional clips that need to be attached, the process returns to operation 1300. If there are no more multifunctional clips to attach, the process ends in step 1350.

According to embodiments of the present disclosure, a device for securing objects such as ornamental light strings or misting systems, signs, banners and the like to surfaces, the device including a first clip portion having a bottom section, a first leg section and a second leg section, the first and second leg sections further being substantially perpendicular to the bottom section. Where the first clip portion further comprises a pole adaptor attachment portion that is further comprised of at least one uniform shaped section, the at least one uniform shaped section located on a bottom surface of the bottom section. A second clip portion including an arm projecting away from the pole adaptor attachment portion, such that at a distal end of the arm a leg portion projects at an acute angle to an approximate direction of the arm, and in a same direction of a distal end of the first leg section. Wherein the leg portion is displaced in a space by a length of the arm such that the leg portion projects at an acute angle to the pole adaptor attachment section.

According to aspects of the present disclosure, the at least one uniform shaped section of pole adaptor attachment portion is defined as a rectangle shape. The first and second leg sections further comprise a slight bend, with the vertex of the slight bend directed inward. The first leg section of the first clip portion includes a retention tab that is a hook shaped and attached to the first leg section, such that the retention tab extends toward the leg portion of the second clip portion. The retention tab further includes a first light string attachment portion located between an inside surface of the retention tab and an outside surface of the first leg section of the first clip section.

According to aspects of the present disclosure, an inside surface of the distal end of the arm of the second clip portion in combination with a ridge located on an inside surface of the leg portion of the second clip portion further includes a second light string attachment portion, such that the ridge extends toward the pole adaptor attachment section. A third light string attachment portion is located on the second leg section and extends from an attachment point of the second leg section and the bottom section and further comprises a substantially C-shaped clip 43 (see FIG. 1 and FIG. 2). The third light string attachment portion includes an accurately shaped gripping arm attached to a free terminal end of a flex section located near one end of the C-shaped clip 43.

According to embodiments of the present disclosure, there is provided a device for securing ornamental light strings to surfaces. The device includes a first clip portion with a first leg section and a second leg section, wherein the first and second leg sections further being substantially perpendicular to a bottom section. A pole adaptor attachment portion having at least one uniform shaped cavity section located on a bottom surface of the bottom section of the first clip portion. A second clip portion including an arm projecting away from the pole adaptor attachment portion, such that the arm includes a leg portion projecting at an acute angle relative to the pole adaptor attachment portion in an approximate direction of the arm, and in a same direction of the first leg section, wherein the leg portion is displaced in a space by a length of the arm.

According to aspects of the present disclosure, the first clip portion includes a retention tab that is a hook shaped and attached to the first leg section, such that the retention tab extends toward the leg portion of the second clip portion. The retention tab further includes a first light string attachment portion located between an inside surface of the retention tab and an outside surface of the first leg section of the first clip portion. The first and second leg sections further comprise a slight bend, with the vertex of the slight bend directed inward. A third light string attachment portion is located on the second leg section of the first clip portion and extends from an attachment point of the second leg section and the bottom section and further comprises a substantially C-shaped clip. Wherein the third light string attachment portion includes an arcuately shaped gripping arm attached to a free terminal end of a flex section located near one end of the C-shaped clip.

According to embodiments of the present disclosure, an apparatus including a telescoping pole having a distal end and a proximal end. A handle with a spring activated trigger is fixed to the proximal end of the telescoping pole, the spring activated trigger is in communication with two or more spring loaded devices, such that upon a pulling of the spring activated trigger a portion of each of the two or more spring loaded devices move from a first closed compressed position to a second open position. An adaptor fixed to the distal end of the telescoping pole includes a channel and the two or more spring loaded devices, wherein each portion of the two or more spring loaded devices extend into a portion of the channel when in the first closed compressed position and in the second open position each portion of the two or more spring loaded devices extend out of the channel. Wherein the adaptor includes a cavity configured to be couplable to a clip in the first closed compressed position, the clip is configured to be removably coupled to one of a first building structure and a second building structure in the second open position. Wherein the channel of the adaptor is configured to be couplable to one of a first female end of the clip or a second female end of the clip in the first closed compressed position.

According to aspects of the present disclosure, the first female end of the clip is flipped upside down with respect to the second female end of the clip. A dimension of the channel corresponds a similar dimension of a pole adaptor attachment portion of the clip, such that a first end of the pole adaptor attachment portion is the first female end of the clip and a second end of the pole adaptor attachment portion is the second female end of the clip. The clip is attachable to the adaptor by the clip biasing each portion of the two or more spring loaded devices from the first closed compressed position to the second open position and back to the first closed compressed position. Wherein the each portion of the two or more spring loaded devices extending into the portion of the channel when in the first closed compressed position as well as extend to a first outer surface and a second outer surface of the adaptor. Wherein the each portion of the two or more spring loaded devices extending to the first outer surface and the second outer surface of the adaptor are configured to displace each portion of the two or more spring loaded devices from the first closed compressed position to the second open position.

A kit for installing objects at elevated positions upon surfaces, the kit including a telescoping pole for controlling from a stable position beneath an area upon which the objects is to be installed, the telescoping pole includes an adaptor engaging to a distal end of the telescoping pole. At least one clip adapted to be installed upon surfaces for supporting the objects. Each clip including an integral, projecting leg portion for engaging the surfaces when the clip is installed, and an integral, attachment portion for supporting the objects, the attachment portion comprising at least one object holding area for supporting the objects. At least one pole adaptor attachment portion for engaging the adaptor of the telescoping pole for temporarily holding and controlling and installing the clip, and means controlled by the telescoping pole for at least temporarily, releasably mounting the at least one pole adaptor attachment portion of the clip to the adaptor of the telescoping pole.

According to aspects of the claimed subject matter regarding the kit, the means for at least temporarily, releasably mounting the at least one pole adaptor attachment portion of the clip to the adaptor of the telescoping pole comprises: a handle with a spring activated trigger is fixed to the proximal end of the telescoping pole, the spring activated trigger is in communication with two or more spring loaded devices, such that upon a pulling of the spring activated trigger a portion of each of the two or more spring loaded devices move from a first closed compressed position to a second open position, wherein the adaptor fixed to the distal end of the telescoping pole includes a channel and the two or more spring loaded devices, wherein each portion of the two or more spring loaded devices extend into a portion of the channel when in the first closed compressed position and in the second open position each portion of the two or more spring loaded devices extend out of the channel, wherein the adaptor includes a cavity configured to be attachable to the at least one pole adaptor attachment portion of the clip in the first closed compressed position, the clip is configured to be removably coupled to surfaces such as one of a first building structure and a second building structure in the second open position, wherein the channel of the adaptor is configured to be attachable to one of a first female end of the clip or a second female end of the at least one pole adaptor attachment portion of the clip in the first closed compressed position.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A device, comprising:

a telescoping pole having a first end and a second end opposite the first end; and an adaptor engaging the first end of the telescoping pole, the adaptor including a channel configured to releasably receive a clip in a selected one of at least a first orientation and a second orientation, wherein the first orientation is configured to couple the clip to a first building structure in a first orientation, and wherein the second orientation is configured to couple the clip to a second building structure in a second orientation that is different than the first orientation, wherein the second end of the telescoping pole is configured to be manipulated by a user so as to release the clip from the channel of the adaptor, and wherein the telescoping pole includes a trigger that is operable by the user so as to release the clip from the channel of the adaptor.

2. The device of claim 1, wherein the channel is configured to be releasably coupled to a pole adaptor attachment portion of the clip.

3. The device of claim 1, wherein the telescoping pole includes a handle at the second end of the telescoping pole.

4. The device of claim 1, wherein the adaptor further includes at least two spring-loaded devices, a portion of each of the at least two spring-loaded devices being biased to extend into the channel so as to retain the clip within the channel.

5. The device of claim 4, wherein the at least two spring-loaded devices are configured to retract from within the channel so as to release the clip from within the channel when the trigger of the telescoping pole is operated.

6. The device of claim 1, wherein the clip includes a first clip portion including a bottom section having a first end and a second end opposite the first end, a first leg section extending from the first end of the bottom section, a second leg section extending from the second end of the bottom section, and a pole adaptor attachment portion; an arm projecting away from the first leg section; and a light string attachment portion located on the first leg section, the light string attachment portion including a substantially C-shaped clip defined by the arm, the first leg section, and the pole adaptor attachment portion.

7. The device of claim 6, wherein the clip further includes a further light string attachment portion.

8. A kit, comprising:

a pole mounting assembly including:

a telescoping pole having a proximal end and a distal end opposite the proximal end;

an adaptor engaging the distal end of the telescoping pole, the adaptor including a channel, the channel being configured to be releasably couplable to a clip in at least a first position and a second position; and a handle fixed to the proximal end of the telescoping pole, the handle being configured to be manipulated by a user so as to release a clip from the channel of the adaptor; and at least one clip configured to be removably coupled to a first building structure in a first orientation when releasably coupled to the channel in the first position, and configured to be removably coupled to a second building structure in a second orientation that is different from the first orientation when releasably coupled to the channel in the second position, wherein the adaptor further includes at least two spring-loaded devices, a portion of each of the at least two spring-loaded devices being biased to extend into the channel so as to retain the clip within the channel.

9. The kit of claim 8, wherein the telescoping pole includes a trigger proximate the proximal end, the trigger being operable to retract the at least two spring-loaded devices from the channel, thereby releasing the clip from within the channel.

10. The kit of claim 8, wherein the clip comprises a first clip portion including a bottom section having a first end and a second end opposite the first end, a first leg section extending from the first end of the bottom section, a second leg section extending from the second end of the bottom section, and a pole adaptor attachment portion; an arm projecting away from the first leg section; and a light string attachment portion located on the first leg section, the light string attachment portion including a substantially C-shaped clip defined by the arm, the first leg section, and the pole adaptor attachment portion.

11. A method, comprising:

providing a pole mounting assembly, wherein the pole mounting assembly includes:

a telescoping pole having a proximal end and a distal end opposite the proximal end;

an adaptor engaging the distal end of the telescoping pole, the adaptor including a channel, the channel being configured to be releasably couplable to a clip in at least a first position and a second position; and a handle fixed to the proximal end of the telescoping pole, the handle being configured to be manipulated by a user so as to release a clip from the channel of the adaptor;

providing a clip, wherein the clip is configured to be removably coupled to a first building structure in a first orientation when releasably coupled to the channel in the first position, and configured to be removably coupled to a second building structure in a first orientation that is different from the first orientation when releasably coupled to the channel in the second position, wherein the clip is oriented upward in the first position, and wherein the clip is oriented downward in the second position;

coupling the clip to the channel of the pole mounting assembly in a selected one of the first and second positions;

coupling the clip to a selected one of the first and second building structures that corresponds to the selected one of the first and second positions; and manipulating the handle to decouple the clip from the channel of the pole mounting assembly, thereby installing the clip on the selected one of the first and second building structures.

12. The method of claim 11, wherein the first building structure faces upward, and wherein the second building structure faces downward.

13. The method of claim 11, wherein the first building structure is an eave and the second building structure is a gutter.

14. The method of claim 11, wherein the first building structure is an eave and the second building structure is a shingle.

15. The method of claim 11, wherein the adaptor further includes at least two spring-loaded devices, a portion of each of the at least two spring-loaded devices being biased to extend into the channel so as to retain the clip within the channel.

16. The method of claim 11, wherein the at least two spring-loaded devices are configured to retract from within the channel so as to release the clip from within the channel when the trigger of the telescoping pole is operated.

17. The method of claim 11, wherein the clip comprises a first clip portion including a bottom section having a first end and a second end opposite the first end, a first leg section extending from the first end of the bottom section, a second leg section extending from the second end of the bottom section, and a pole adaptor attachment portion; an arm projecting away from the first leg section; and a light string attachment portion located on the first leg section, the light string attachment portion including a substantially C-shaped clip defined by the arm, the first leg section, and the pole adaptor attachment portion.

* * * * *